(12) United States Patent
Buchanan et al.

(10) Patent No.: US 8,639,941 B2
(45) Date of Patent: Jan. 28, 2014

(54) DATA SECURITY IN MOBILE DEVICES

(76) Inventors: Bruce Buchanan, Alpharetta, GA (US);
Gary Peacock, Woodstock, GA (US)

( * ) Notice: Subject to any disclaimer, the term of this patent is extended or adjusted under 35 U.S.C. 154(b) by 948 days.

(21) Appl. No.: 11/950,897

(22) Filed: Dec. 5, 2007

(65) Prior Publication Data
US 2009/0150680 A1    Jun. 11, 2009

(51) Int. Cl.
*G06F 11/30*    (2006.01)

(52) U.S. Cl.
USPC ........................................... 713/189

(58) Field of Classification Search
USPC ............... 713/189, 193, 164–167; 380/28
See application file for complete search history.

(56) References Cited

U.S. PATENT DOCUMENTS

| | | | | |
|---|---|---|---|---|
| 2002/0172363 A1* | 11/2002 | Dierks et al. | | 380/259 |
| 2003/0097579 A1* | 5/2003 | England et al. | | 713/193 |
| 2007/0113079 A1* | 5/2007 | Ito et al. | | 713/166 |
| 2007/0162760 A1* | 7/2007 | Samuelsson et al. | | 713/182 |
| 2009/0132816 A1* | 5/2009 | Lee | | 713/164 |

* cited by examiner

*Primary Examiner* — Beemnet Dada
(74) *Attorney, Agent, or Firm* — Sterne, Kessler, Goldstein & Fox PLLC (57) ABSTRACT

Systems, methods for computer program products for securely storing data in a data store or in an external data store associated with a mobile device are described herein. Data that is being sent from an application module to a data store, on the mobile device or an external data store used by the mobile device is first encrypted by a security manager. The security manager encrypts data based on an encryption algorithm that may be selected by a user. Data received from an application module is thus stored in an encrypted form on a data store. When an application requests data from the data store, the security manager decrypts the data and provides the data to the application module in its decrypted form. All data that is transmitted to or received from a data store or an external data store is intercepted by the security manager for encryption and decryption respectively.

14 Claims, 8 Drawing Sheets

DATA SECURITY IN MOBILE DEVICES

BACKGROUND OF THE INVENTION

1. Field of the Invention

The present invention relates generally to mobile technology, and more particularly to security of mobile device data.

2. Related Art

A variety of mobile devices (such as personal data assistants, or PDAs, handheld computers, cellular phones, pagers, etc.) exist. Such mobile devices include ones based on the Palm operating environment and the Windows CE operating environment.

A variety of software applications for these devices also exist which allow a user to manage data on a mobile device.

Various methods to secure data on mobile devices have been proposed. A common form of securing data on a mobile device is to allow a user to create a user name and a password associated with the username. In such a scenario, the data stored on a user's mobile device is made available to the user when the user logs into the mobile device using his username and password. Although this approach may restrict access to data, the data itself is not stored in an encrypted manner. Furthermore, once a user logs into a mobile device using a valid username and password combination, all data stored on the mobile device is made available to the user. Anyone who obtains access to a mobile device after a user has logged in or obtains access to a physical module that stores data in a mobile device may be able to view and copy the data as it lacks any form of security or encryption. In some cases, un-authorized applications or malicious processes may request data stored on a mobile device, causing transfer of secret or private data into public domain. Thus a need exists to provide for security of such data at all times.

Therefore, what is needed is a system, method and computer program product that secures data stored on a mobile device or any external data store used by a mobile device in a manner that prevents accidental or intentional use of the data.

BRIEF SUMMARY OF THE INVENTION

Briefly stated, the invention includes a system, method, computer program product and combinations and sub-combinations thereof for enabling encryption and decryption of data that is being manipulated by a user in a mobile device. Data that is being sent from an application module to a data store, on the mobile device or an external data store used by the mobile device, is first encrypted by a security manager. The security manager encrypts data based on an encryption algorithm that may be selected by a user. Data received from an application module is thus stored in an encrypted form on a data store. When an application requests data from the data store, the security manager decrypts the data and provides the data to the application module in its decrypted form. Thus all data that is transmitted to or received from a data store or an external data store is intercepted by the security manager for encryption and decryption respectively.

In this way, data on a data store accessed by a mobile device is encrypted at all times by the security manager.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

The present invention relates to systems, methods and computer program products for enabling encryption and decryption of data that is being manipulated by a user in a mobile device. Encryption and decryption of data is achieved by a security manager that intercepts data transmitted between an application module and a data store.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This detailed description of embodiments of the present invention is organized into several sections as shown by the following table of contents.

Table of Contents

I. System
II. Encryption of Data
III. Accessing Encrypted Data
IV. Start-up Sequence
V. Data Access Control
VI. Control of Application Display
VII. Control of External Data Store
VIII. Example Computer Embodiment

I. System

Figure 1:
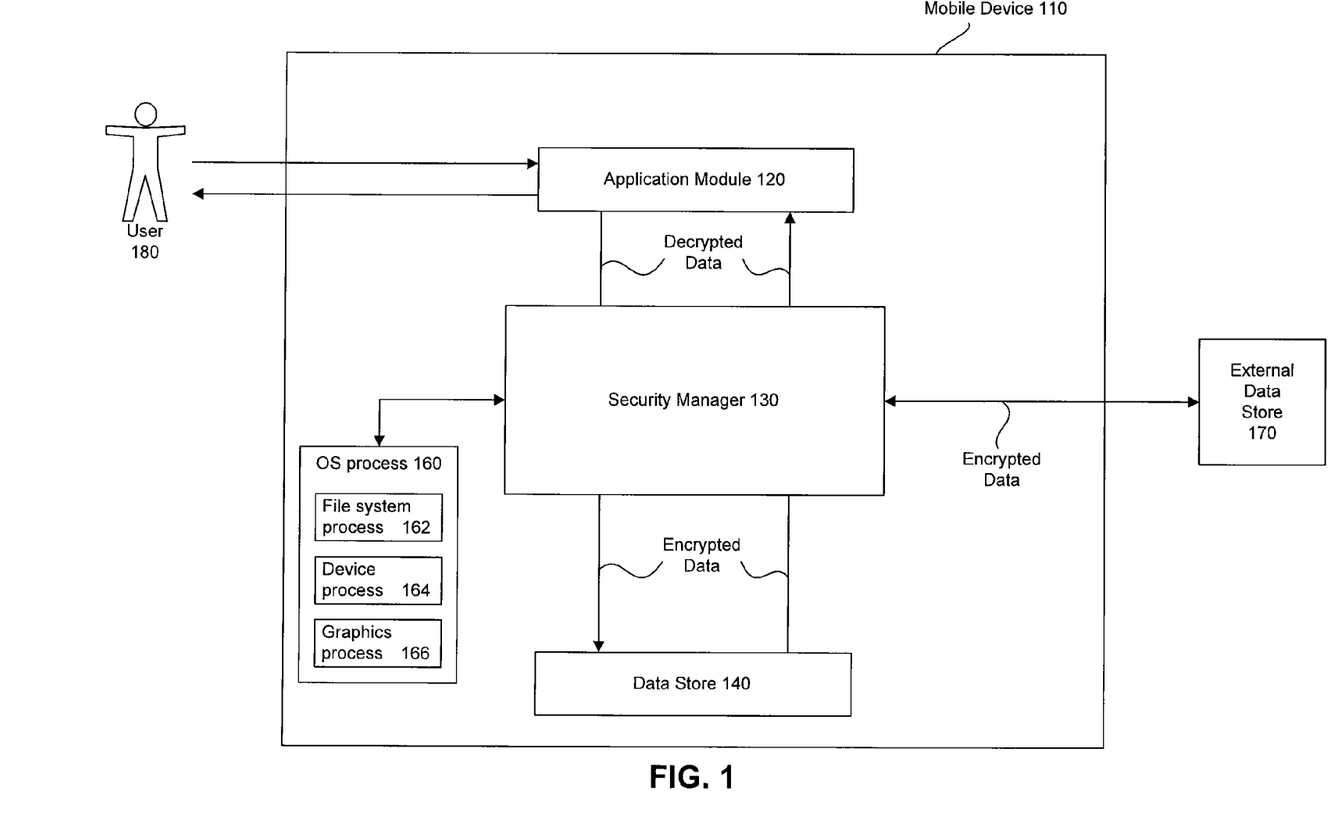
FIG. 1 is an architecture diagram of a system for providing security of mobile device data according to an embodiment of the invention.

This section describes a general system architecture for enabling the real time encryption and decryption of data that is being manipulated by a user in a mobile device according to an embodiment of the invention as illustrated in FIG. 1. FIG. 1 is an architecture diagram of mobile device 110 in an embodiment of the invention. (While the following is described in terms of mobile devices, the invention is not limited to this embodiment. The invention is applicable to any device having generally the structure of FIG. 1, or that would benefit from the function as described herein).

Mobile device 110 can include, but is not limited to, a device having a processor and memory for executing and storing instructions. Such a mobile device may include software, firmware, and hardware or some combination thereof. The software may include one or more applications and an operating system. The hardware can include, but is not limited to, a processor, memory and user interface display. An optional input device, such as a mouse, stylus or any other pointing device, may be used. In an embodiment, mobile device 110 includes application module 120, security manager 130, operating system (OS) process 160 and data store 140. An external data store 170 may be connected to mobile device 110.

Application module 120 may be any type of application that can be instantiated on mobile device 110. Such an application includes, but is not limited to, a word processing application, a spread sheet application, a mail application, a financial application, a browser and forms of voice, video and multimedia applications or any other application that makes use of data. Application module 120 may allow user 180 to store data or receive data from data store 140 or external data store 170. As an example, user 180 may save a file into the data store 140 or external data store 170 after performing edits on the file using an application module 120 such as a word processing application. User 180 may also be able to retrieve a file from data store 140 or external data store 170 using application module 120.

Security manager 130 intercepts data transmitted by application module 120 to data store 140 or external data store 170. In an embodiment, security manager 130 is a device driver. (It is noted the invention is not limited to this example embodiment. Other ways of implementing security manager 130 will be apparent to persons skilled in the relevant arts, and the scope and spirit of the invention includes those other embodiments.) A device driver, for example, allows computer applications to interact with hardware devices in a computer system. Security manager 130 encrypts data that is transmitted from application module 120 to data store 140 or external data store 170 and decrypts data that is transmitted from data store 140 or external data store 170 to application module 120. In an embodiment, security manager 130 may selectively enforce encryption of data in data store 140 or external data store 170 based on an input from user 180 through application module 120. As an example, user 180 may select data that needs to be protected through encryption by security manager 130.

In an embodiment, not intended to limit the invention, security manager 130 uses FIPS 140-2 compliant encryption. FIPS 140-2 is known to persons skilled in the art and is a U.S. government computer security standard used to accredit cryptographic modules. Some of the cryptographic algorithms used are triple DES (3DES) and advanced encryption standard (AES). However, the invention could alternatively employ any well known encryption algorithm process or technique.

Security manager 130 intercepts messages communicated between application module 120 and data store 140 or external data store 170 so that the data in data store 140 or external data store 170 is encrypted at all times. Operation of security manager 130 is explained in greater detail further in the application.

Operating system process 160 may instantiate security manager 130 in mobile device 110 upon start-up. The start-up sequence of mobile device 110 is described further in the application. Operating system (OS) process 160 further includes file system process 162, device process 164 and graphics process 166. File system process 162, for example, assists application module 120 to interact with a file system on data store 140 or external data store 170. Device process 164, for example, assists application module 120 to interact with any external media, such an external data store 170, that may be added to mobile device 110. Graphics process 166, for example, assists application module 120 to interact with a graphics, windowing and other related events in mobile device 110.

Data store 140 or external data store 170 may be any form of memory. Such memory may include flash drives, SD cards or any other form of volatile or non-volatile memory. Data store 140 or external data store 170 may be a form of removable or non-removable memory.

Encryption and decryption of data in mobile device 110 by security manager 130 is explained in detail in the following sections.

II. Encryption of Data

Figure 2:
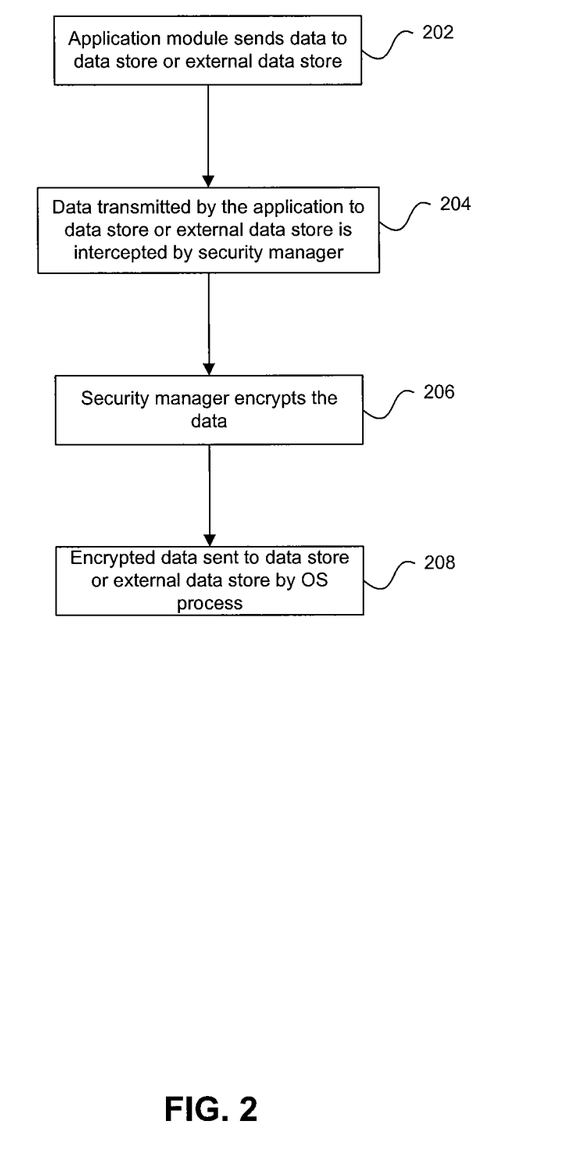
FIG. 2 is a flowchart illustrating various steps involved in intercepting and storing encrypted data in a data store or external data store according to an embodiment of the invention.

A process for encrypting data transmitted to data store 140 or external data store 170, according to an embodiment of the invention, will now be described in detail with reference to flowchart 200 in FIG. 2.

In step 202, application module 202 sends data to data store 140 or external data store 170.

In step 204, data transmitted by application module 120 is intercepted by security manager 130.

In step 206, security manager 130 encrypts the data intercepted in step 204, based on an encryption algorithm, that may be specified by an administrator.

In step 208, encrypted data generated in step 206 is sent to data store 140 or external data store 170 by OS process 160. In an embodiment, OS process 160 may request file system process 162 to send data to data store 140 or external data store 170.

In this way, data intercepted by the security manager 130 is encrypted and stored in data store 140 or external data store 170. User 180 interacting with application module 120 is not interrupted in any manner during the encryption process.

III. Accessing Encrypted Data

Figure 3:
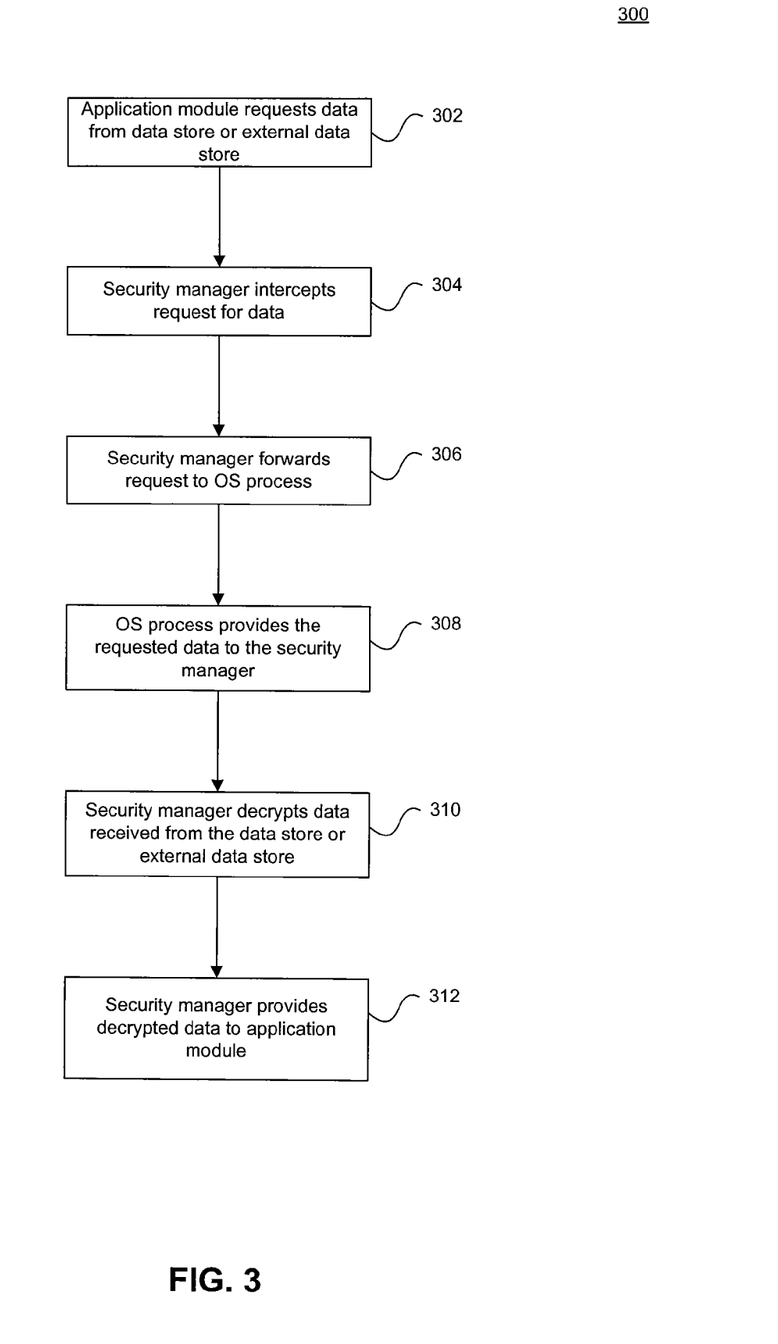
FIG. 3 is a flowchart illustrating various steps involved in providing an application module with decrypted data according to an embodiment of the invention.

A process for accessing encrypted data in data store 140 or external data store 170 according to an embodiment of the invention will now be described in detail with reference to flowchart 302 in FIG. 3.

In step 302, user 180 requests application module 120 to retrieve data stored in data store 140 or external data store 170. In an example, not intended to limit the invention, data may be a text document and application module 120 may be a word processing tool.

In step 304, security manager 130 intercepts the request made by application module 120 in step 302.

In step 306, security manager 130 forwards the request to OS process 160. In an embodiment, OS process 160 may request file system process 162 to retrieve data from data store 140 or external data store 170.

In step 308, data retrieved by file system process 162 in step 306 is decrypted by security manager 130.

In step 312, security manager 130 provides decrypted data to application module 120.

In this way, in an embodiment, data stored in data store 140 or external data store 170 is always in encrypted form and is only decrypted by security manager 130 when requested by application module 120. Furthermore, encryption and decryption does not require any modification to application module 120 or any intervention by user 180.

IV. Start-Up Sequence

Figure 4:
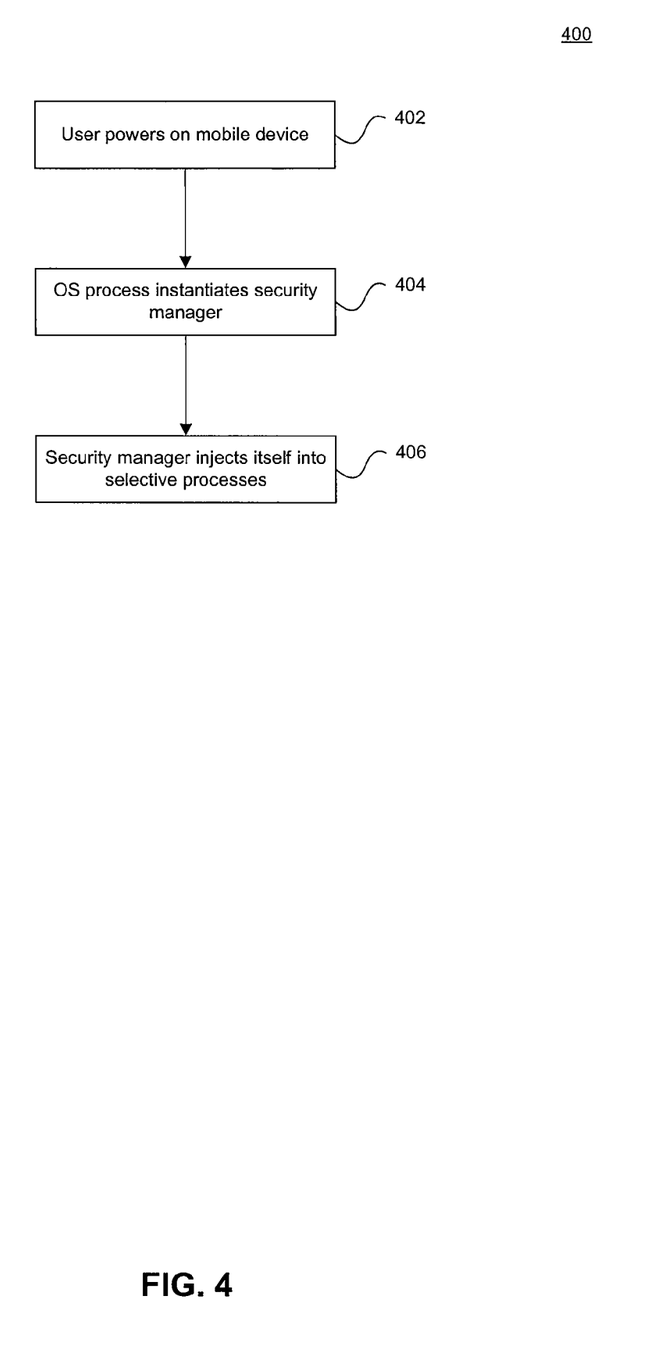
FIG. 4 is a flowchart illustrating various steps involved in a start-up sequence of a mobile device according to an embodiment of the invention.

A start-up sequence process of mobile device 110 according to an embodiment of the invention will now be described in detail with reference to flowchart 400 in FIG. 4.

In step 402, mobile device 110 is powered on. Mobile device 130 may be powered on in response to an input from user 180.

In step 404, operating system (OS) process 160 instantiates and starts operation of security manager 130.

In step 406, security manager 130 injects itself into the process space of selective processes. In an embodiment, security manager 130 injects itself into process space of OS process 160, file system process 162, device process 164 and graphics process 166 using entry points in OS process 160 used by mobile device 110. As an example, not intended to limit the invention, injection comprises instantiation into an existing process space. An entry point, for example, may be a memory address corresponding to a point in the code of a computer program. Once injected into each process space, security manager 130 intercepts specific application program interface (API) calls made by application module 120 to control access and encrypt data to be stored in data store 140 or external data store 170.

V. Data Access Control

Figure 5:
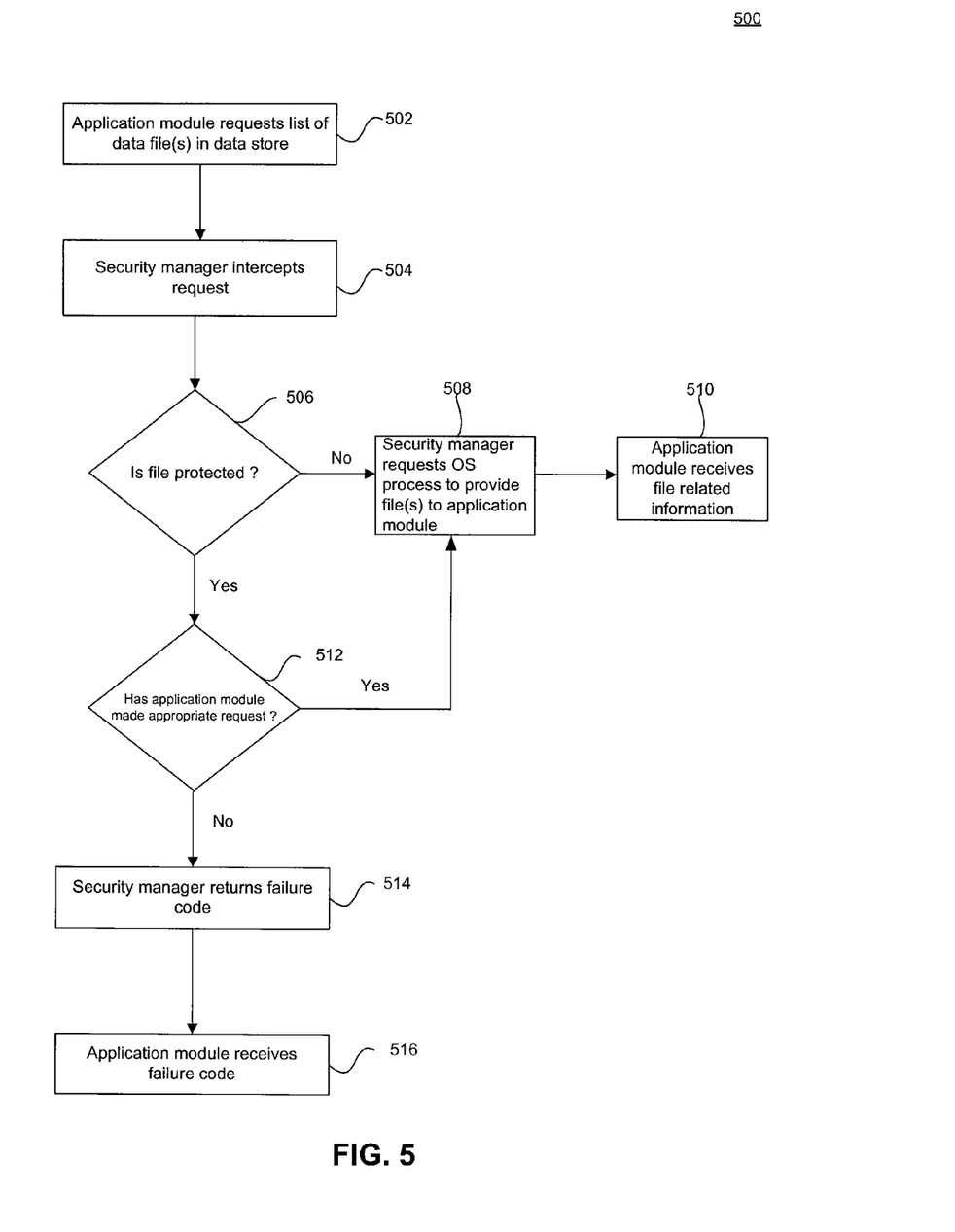
FIG. 5 is a flowchart illustrating various steps involved in listing of files stored in a data store according to an embodiment of the invention.

A process for the control of data accessed by application module 120 according to an embodiment of the invention will now be described in detail with reference to flowchart 500 in FIG. 5.

In step 502, user 180 requests application module 120 to list data files stored in data store 140 or external data store 170. In an example, not intended to limit the invention, application module 120 may be a file management tool.

In step 504, security manager 130 intercepts the request made by application module 120 in step 502 and identifies files that are protected in data store 140 or external data store 170. In an embodiment, such a request may be a call to an application program interface associated with security manager 130.

In step 506, security manager 130 checks if the requested file is protected. If the requested file is not protected, steps 508 and 510 are performed.

In step 508, security manager 130 requests OS process 160 to provide requested file or information related to the requested file. In an embodiment, OS process 160 may request file system process 162 to retrieve data from data store 140 or external data store 170.

In step 510, application module 120 receives the requested file or information related to requested file.

Returning to step 506, if the requested file is protected, step 512 is performed.

In step 512, security manager 130 checks if application module 120 has made an appropriate request. If application module 120 has made an appropriate request, steps 508 and 510 are performed as described earlier. If application module 120 has not made an appropriate request, steps 514 and 516 are performed.

In step 514, security manager 130 returns a failure code that may indicate that the files are unavailable.

In step 516, application module 120 receives the failure code returned in step 514. In an example, not intended to limit the invention, application module 120 may not be able to display names of protected files upon receipt of the failure code.

In this way, security manager 130 controls data accessed by application module 120 in data store 140 or external data store 170 as files which are protected are not made available to application module 120.

VI. Control of Application Display

Figure 6:
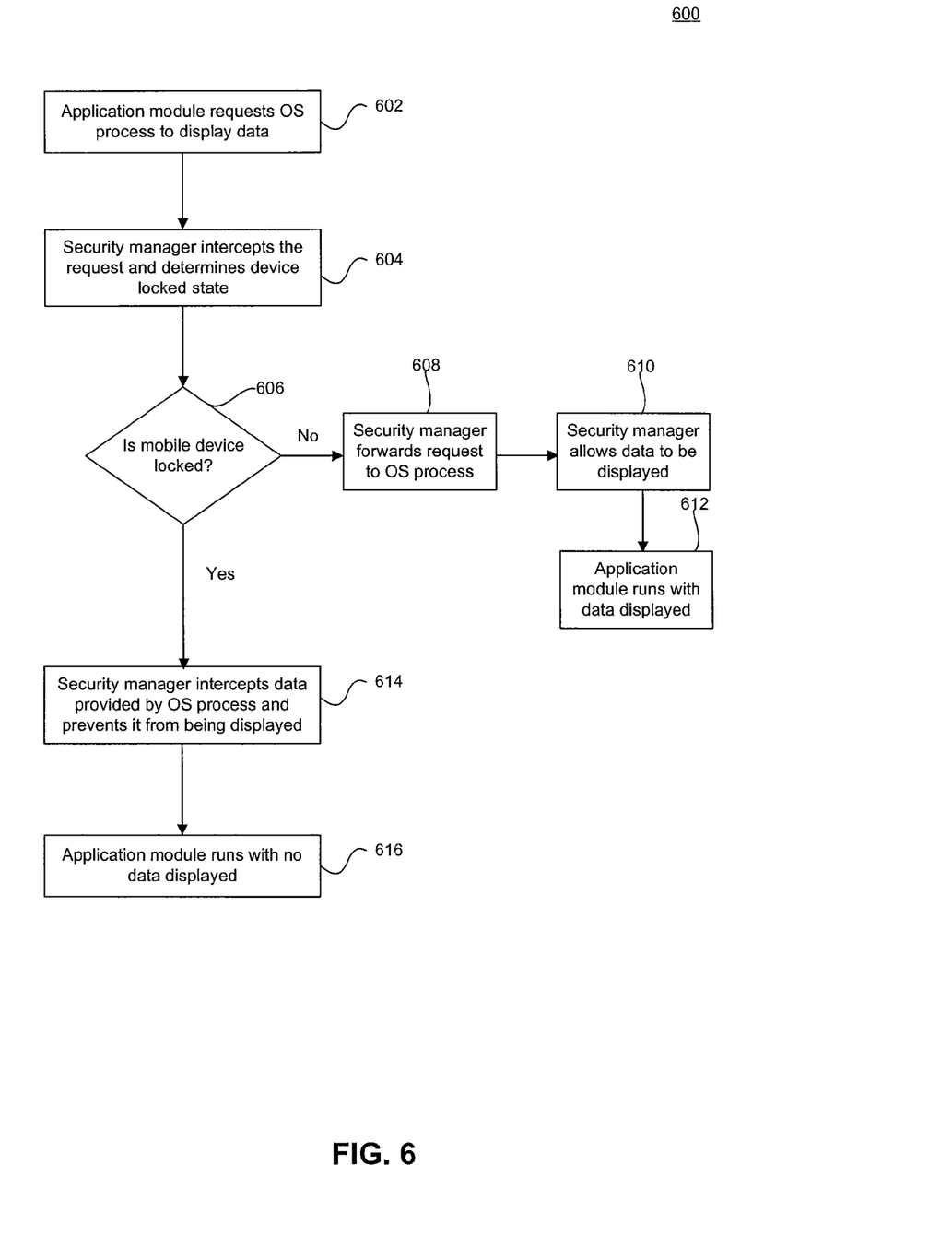
FIG. 6 is a flowchart illustrating various steps involved in display of data by an application module in an embodiment of the invention.

A process for the control of data displayed by application module 120 according to an embodiment of the invention will now be described in detail with reference to flowchart 600 in FIG. 6.

In step 602, application module 120 requests an OS process to display data stored in data store 140 or external data store 170 to user 180. In an embodiment, OS process 160 may request graphics process 166 to display data stored in data store 140 or external data store 170 to user 180.

In step 604, security manager 130 intercepts the request made in step 604 and determines a locked state of mobile device 110.

In step 606, if mobile device 110 is found to be in an unlocked state, steps 608, 610 and 612 are performed. As an example, not intended to limit the invention, mobile device 110 may transition from a locked state to an unlocked state on receipt of valid credentials from user 180, for example, a valid username and password combination.

In step 608, the request made in step 604 is forwarded by the security manager 130 to an OS process 160. In an embodiment, OS process 160 may request graphics process 166 to send data to data store 140 or external data store 170. In step 610, security manager 130 allows the data to be displayed to user 180 through application module 120.

In step 612, application module 120 displays data requested by user 180.

Returning to step 606, if mobile device 110 is found to be in a locked state steps 614 and 616 are performed.

In step 614, security manager 130 intercepts data provided by OS process 160 and prevents it from being displayed by application module 120.

In step 616, application module 120 does not display data to user 180 but continues to run on mobile device 110 and may allow interaction from user 180.

In this way, security manager 130 manages application module 120 when mobile device 110 is in a locked state.

VII. Control of External Data Store

Figure 7:
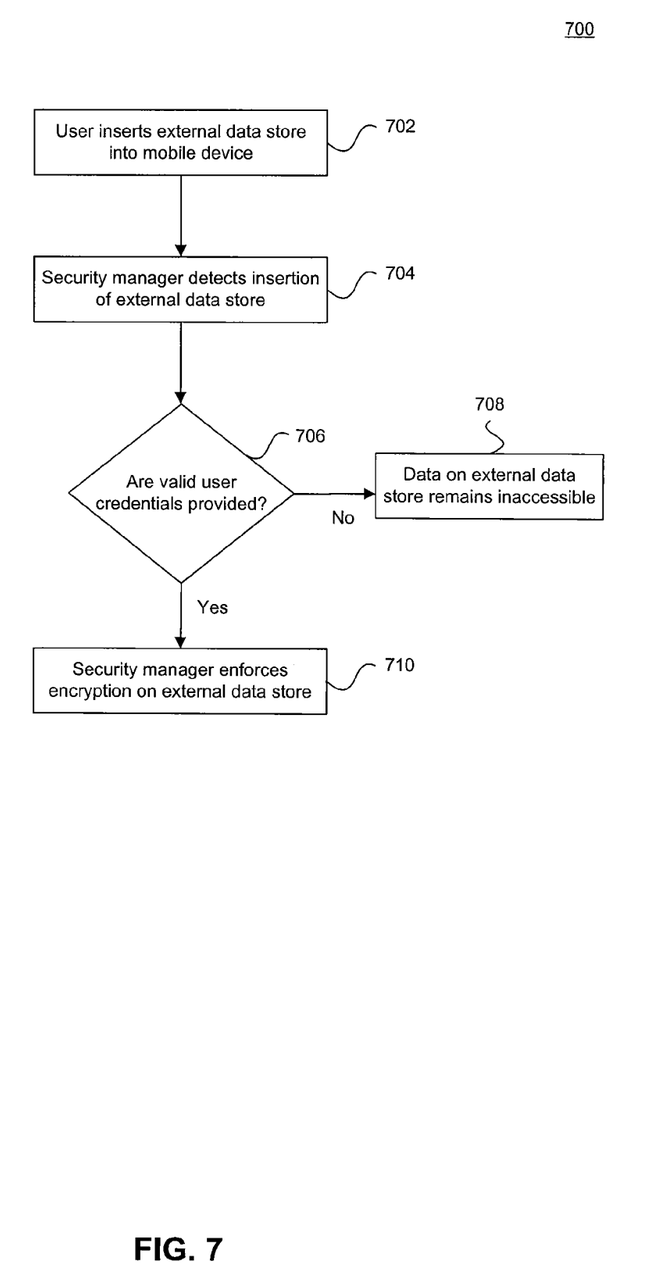
FIG. 7 is a flowchart illustrating enforcement of encryption on an external data store in an embodiment of the invention.

A process for the control of external data store 170 by security manager 130 according to an embodiment of the invention will now be described in detail with reference to flowchart 700 in FIG. 7.

In step 702, user 180 inserts external data store 170 into mobile device 110.

In step 704, security manager 130 detects insertion of external data store 170.

In step 706, security manager 130 checks if valid user credentials have been provided by user 180. If valid user credentials have not been provided, step 708 is performed and data on external data store 170 remains inaccessible.

Returning to step 706, if valid user credentials have been provided security manager 130 enforces encryption on external data store 170. In an embodiment, enforcement of encryption comprises intercepting and controlling all data from application module 120 to external data store 170. In another embodiment, enforcement of encryption comprises controlling data accessed by application module 120. As an example, application module 120 may now write or read data from external data store 170 using methods illustrated in FIG. 2 and FIG. 3.

In this way, security manager 130 intercepts control as soon as external data store 170 is made available to mobile device 110. This may prevent user 180 from copying sensitive data from mobile device 110 to external data store 170 for access at a later time using another mobile device that may not use security manager 130.

VIII. Example Computer Embodiment

Figure 8:
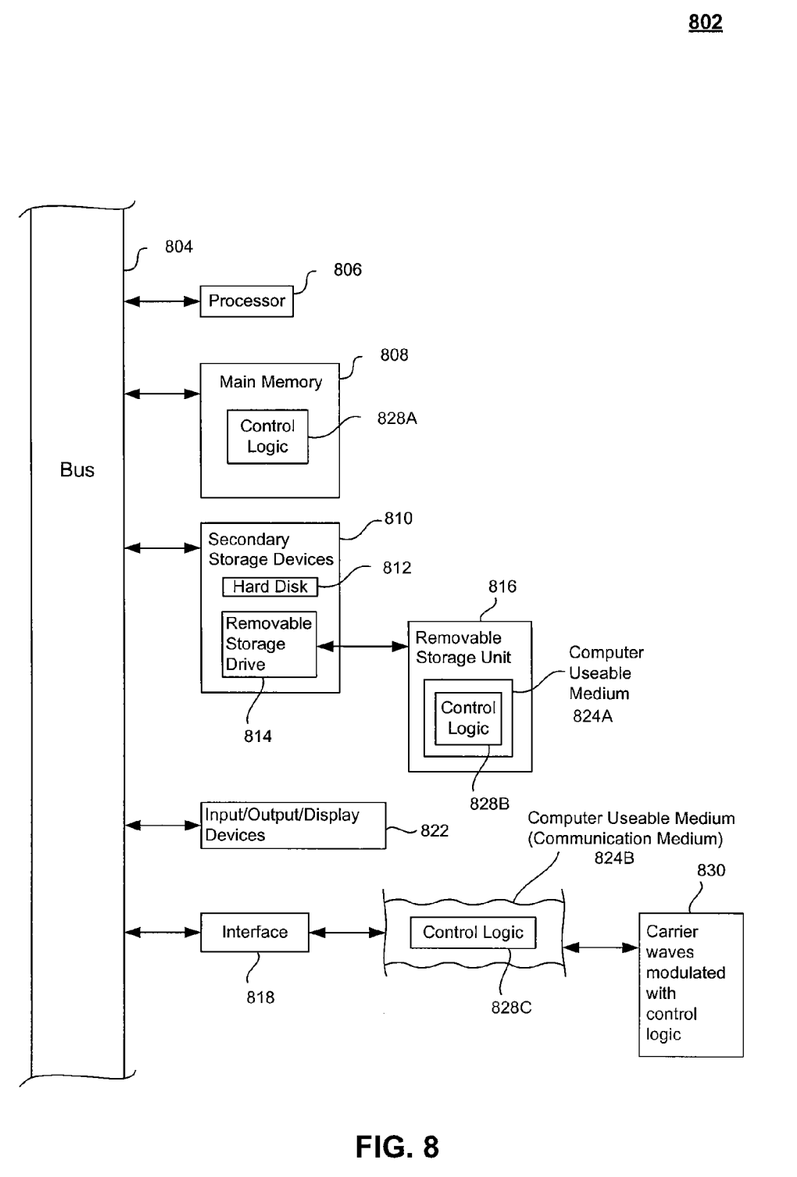
FIG. 8 illustrates an example computer useful for implementing components of the invention.

In an embodiment of the present invention, the system and components of embodiments described herein are implemented using well known computers, such as computer 802 shown in FIG. 8. For example, security manager 130 can be implemented using computer(s) 802.

The computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 802, the main memory 808, secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A processor based method of securing data used by a mobile device, comprising:
    obtaining data from an application module; and
    encrypting the data using a security manager injected into a plurality of process spaces of the mobile device, wherein the injection comprises instantiation into the plurality of process spaces using an entry point of an operating system process, and
    wherein the entry point is a memory address corresponding to a point in a program code of the operating system process, and
    wherein the plurality of process spaces include process spaces of the operating system process and processes included in the operating system process, and
    wherein the obtaining and the encrypting are performed using one or more processors.

2. The method of claim 1, further comprising:
    storing encrypted data in a data store;
    intercepting the encrypted data returned from the data store upon a request from the application module;
    decrypting the encrypted data using the security manager to generate decrypted data; and
    providing the decrypted data to the application module.

3. The method of claim 1, wherein the obtaining step comprises;
    receiving a request from the application module to store data in a data store.

4. The method of claim 1, wherein the encrypting step comprises encrypting the data using an encryption algorithm.

5. The method of claim 4, further comprising:
enabling a user to select the encryption algorithm.

6. The method of claim 2, wherein the data store is an external data store.

7. The method of claim 2, further comprising:
controlling data displayed by the application module using the security manager and a graphics process.

8. A processor based system for securing data used by a mobile device, comprising:
an application module; and
a security manager injected into a plurality of process spaces of an operating system process and processes included in the operating system process of the mobile device, wherein the injection comprises instantiation into the plurality of process spaces using an entry point of the operating system process, and wherein the entry point is a memory address corresponding to a point in a program code of the operating system process, the security manager configured to encrypt data received from the application module, and to decrypt encrypted data requested by the application module,
wherein the application module and the security manager are implemented on one or more processors.

9. The system of claim 8, further comprising:
the operating system(OS) process;
a file system process configured to assist the application module to interact with a file system on a data store;
a device process configured to assist the application module to interact with external media; and
a graphics process configured to assist the application module to interact with graphics and windowing events in the mobile device, wherein the file system process, the device process and the graphics process communicate with the OS process.

10. The system of claim 9, wherein the data store is an external data store.

11. The method of claim 1, further comprising:
instantiating the security manager upon start-up of an operating system (OS) process of the mobile device.

12. The method of claim 1, further comprising:
intercepting application program interface (API) calls made by the application module at the process spaces.

13. The method of claim 1, wherein the process spaces include process spaces of a file system process, a device process and a graphics process.

14. An article of manufacture including a non-transitory computer-readable medium having instructions stored thereon that, when executed by a computing device, cause the computing device to perform operations comprising:
obtaining data from an application module; and
encrypting the data using a security manager injected into a plurality of process spaces of the mobile device, wherein the injection comprises instantiation into the process spaces using an entry point of an operating system process, and
wherein the entry point is a memory address corresponding to a point in a program code of the operating system process, and
wherein the plurality of process spaces include process spaces of the operating system process and processes included in the operating system process, and
wherein the obtaining and the encrypting are performed using one or more processors, and wherein the instructions are executed by the computing device.

* * * * *